United States Patent
Rojo Saiz et al.

(10) Patent No.: US 12,221,951 B2
(45) Date of Patent: Feb. 11, 2025

(54) WIND TURBINE BLADE

(71) Applicant: Siemens Gamesa Renewable Energy Innovation & Technology S.L., Sarriguren (DK)

(72) Inventors: Nicolas Rojo Saiz, Navarra (ES); Javier Yuste Soler, Navarra (ES)

(73) Assignee: SIEMENS GAMESA RENEWABLE ENERGY INNOVATION & TECHNOLOGY S.L., Sarriguren (ES)

( * ) Notice: Subject to any disclaimer, the term of this patent is extended or adjusted under 35 U.S.C. 154(b) by 0 days.

(21) Appl. No.: 17/641,113

(22) PCT Filed: Sep. 11, 2020

(86) PCT No.: PCT/EP2020/075542
§ 371 (c)(1),
(2) Date: Mar. 8, 2022

(87) PCT Pub. No.: WO2021/048403
PCT Pub. Date: Mar. 18, 2021

(65) Prior Publication Data
US 2022/0333574 A1    Oct. 20, 2022

(30) Foreign Application Priority Data

Sep. 13, 2019  (EP) ..................... 19380019
Nov. 25, 2019  (EP) ..................... 19380032

(51) Int. Cl.
*F03D 1/06*     (2006.01)
*B29D 99/00*    (2010.01)
*B29L 31/08*    (2006.01)

(52) U.S. Cl.
CPC ....... *F03D 1/0675* (2013.01); *B29D 99/0028* (2013.01); *F03D 1/0681* (2023.08); *B29L 2031/085* (2013.01); *F05B 2280/6003* (2013.01)

(58) Field of Classification Search
CPC .. B29D 99/0028; F03D 1/0675; F03D 1/0681
See application file for complete search history.

(56) References Cited

U.S. PATENT DOCUMENTS 9,050,786 B2    6/2015  Dahl et al.
9,951,750 B2 *  4/2018  Caruso ................. F03D 1/0675
(Continued)

FOREIGN PATENT DOCUMENTS

DE    102017126276 A1 *  5/2019
EP      1 160 072 A2     12/2001
(Continued)

OTHER PUBLICATIONS

Written Opinion in EPO Application 19 380 032.3 (Year: 2023).*
International Search Report & Written Opinion for PCT/EP2020/075542 issued Dec. 7, 2020.

*Primary Examiner* — Topaz L. Elliott
(74) *Attorney, Agent, or Firm* — Schmeiser, Olsen & Watts LLP

(57) ABSTRACT

Provided is a turbine blade, with a first and a second elongated web connected to an upper and a lower half shell, with each web including an upper and a lower flange connecting the respective web to the respective half shell, and with the first and second webs being supported by respective first and second reinforcement structures, which reinforcement structures extend in the lengthwise direction of the blade, wherein each first and second reinforcement structure supporting the first and second web includes at least one stack composed of several pultruded composite strips including carbon fibers with the strips being fixed in
(Continued)

a resin matrix, wherein each at least one stack composed of the pultruded composite strips is an integral part of the respective first and second web and builds the respective flange, which is attached to the inner layer of the respective upper and lower shell.

7 Claims, 4 Drawing Sheets

(56) References Cited

U.S. PATENT DOCUMENTS

| | | | | |
|---|---|---|---|---|
| 10,487,797 | B2 * | 11/2019 | Hancock | B29C 70/865 |
| 11,326,576 | B2 * | 5/2022 | Randall | B29D 99/0028 |
| 11,592,001 | B2 * | 2/2023 | Lund-Laverick | B29C 70/547 |
| 2008/0219851 | A1 * | 9/2008 | Althoff | F03D 1/0675 |
| | | | | 29/889.71 |
| 2010/0143143 | A1 * | 6/2010 | Judge | B29C 66/124 |
| | | | | 416/226 |
| 2011/0135485 | A1 * | 6/2011 | Wang | B29C 70/521 |
| | | | | 29/889.71 |
| 2011/0142667 | A1 * | 6/2011 | Miebach | F03D 13/10 |
| | | | | 416/223 R |
| 2011/0142669 | A1 * | 6/2011 | Althoff | F03D 1/0675 |
| | | | | 156/292 |
| 2011/0206534 | A1 * | 8/2011 | Riahi | F03D 1/0675 |
| | | | | 416/241 R |
| 2012/0027614 | A1 * | 2/2012 | Yarbrough | F03D 1/065 |
| | | | | 416/226 |
| 2012/0093656 | A1 * | 4/2012 | Esaki | F03D 1/0675 |
| | | | | 416/229 R |
| 2012/0219425 | A1 * | 8/2012 | Sanz Pascual | F03D 1/0675 |
| | | | | 29/889.71 |
| 2013/0055677 | A1 | 3/2013 | Hayden et al. | |
| 2014/0301859 | A1 * | 10/2014 | Hancock | F03D 1/0675 |
| | | | | 156/60 |
| 2015/0056074 | A1 * | 2/2015 | Veldkamp | F03D 80/40 |
| | | | | 416/1 |
| 2015/0308402 | A1 * | 10/2015 | Nielsen | B29C 66/1122 |
| | | | | 156/349 |
| 2015/0316026 | A1 * | 11/2015 | Noronha | B23P 15/04 |
| | | | | 29/889.71 |
| 2016/0146185 | A1 * | 5/2016 | Yarbrough | B32B 5/22 |
| | | | | 156/242 |
| 2017/0021575 | A1 * | 1/2017 | Hansen | B29C 70/342 |
| 2017/0030330 | A1 * | 2/2017 | Caruso | F03D 1/065 |
| 2017/0218918 | A1 * | 8/2017 | Cieslak | B32B 5/12 |
| 2018/0223798 | A1 * | 8/2018 | Caruso | B29D 99/0025 |
| 2018/0372066 | A1 * | 12/2018 | Livingston | F03D 1/0675 |
| 2019/0178227 | A1 * | 6/2019 | Hawkins | B29D 99/0028 |
| 2019/0270261 | A1 * | 9/2019 | Randall | B29C 70/342 |
| 2020/0018283 | A1 * | 1/2020 | Bozsak | F03D 1/0675 |
| 2020/0095978 | A1 * | 3/2020 | Rodwell | B29D 99/0028 |
| 2020/0217296 | A1 * | 7/2020 | Randall | F03D 1/0675 |
| 2020/0386203 | A1 * | 12/2020 | Lund-Laverick | B29C 70/342 |
| 2021/0340947 | A1 * | 11/2021 | Jespersen | F03D 13/10 |
| 2022/0055319 | A1 * | 2/2022 | Rodwell | F03D 1/0675 |
| 2022/0333573 | A1 * | 10/2022 | Atutxa Briones | F03D 1/0675 |

FOREIGN PATENT DOCUMENTS

| | | | |
|---|---|---|---|
| EP | 2 881 237 A1 | 6/2015 | |
| EP | 3 026 259 A1 | 6/2016 | |
| EP | 2 791 500 B1 | 3/2019 | |
| GB | 2530072 A * | 3/2016 | B29B 11/16 |
| WO | 2019/020152 A1 | 1/2019 | |
| WO | WO-2019212554 A1 * | 11/2019 | B29C 70/342 |
| WO | WO-2022063830 A1 * | 3/2022 | |

* cited by examiner

WIND TURBINE BLADE

CROSS-REFERENCE TO RELATED APPLICATIONS

This application claims priority to PCT Application No. PCT/EP2020/075542, having a filing date of Sep. 11, 2020, which claims priority to EP Application No. 19380032.3, having a filing date of Nov. 25, 2019, and EP Application No. 19380019.0, having a filing date of Sep. 13, 2019, the entire contents all of which are hereby incorporated by reference.

FIELD OF TECHNOLOGY

The following relates to a wind turbine blade, with a generally hollow blade body comprising an upper and a lower half shell and first and second elongated webs each extending in the lengthwise direction of the blade and being disposed between and connected to the upper and the lower half shell, with the second web being arranged closer to the trailing edge of the blade and extending only along a part of the trailing edge, with each web comprising an upper and a lower flange connecting the respective web to the respective half shell, and with the first and second webs being supported via respective first and second reinforcement structures relative to the respective half shell, which reinforcement structures extend in the lengthwise direction of the blade, wherein each first and second reinforcement structure supporting the first and second web comprises at least one stack composed of several pultruded composite strips comprising carbon fibers with the strips being fixed in a resin matrix.

BACKGROUND

As commonly known, wind turbine blades are parts of a wind turbine which is used for generating electric power. A wind turbine usually comprises three blades attached to a hub, which is connected to a generator arranged in a nacelle. The blades interact with the passing wind resulting in a rotation of the hub finally driving the generator.

A turbine blade usually comprises a hollow blade body with an upper and a lower half shell, which are usually separately produced and fixed to each other. Within this hollow blade body first and second elongated webs are arranged, which connect both half shells and support them while also transferring the loads acting on the respective shells due to aerodynamic reasons and the circular movement of the blade when rotating. The load comprises pressure and suction loads on the upper and lower half shell and compressive and tensile loads. A wind turbine blade with this common setup is for example disclosed in EP 2 791 500 B1.

For supporting the half shells and for transferring the respective loads each elongated web extends in the lengthwise direction and is connected to the respective half shell via a flange provided at the respective web side, which flange is attached to an inner layer of the upper and lower half shell by an adhesive. For transferring the loads respectively supporting the respective shells each web is supported via respective first and second reinforcement structures relative to the respective half shell. Such a reinforcement structure is commonly also named as a spar cap. Like the respective webs and their flanges, also these reinforcement structures or spar caps extend in a lengthwise direction of the blade. These reinforcement structures, as for example also disclosed in EP 2 791 500 B1, are made of stacks comprising separate carbon fiber pultrusion strips, which are arranged above each other and fixed in a resin matrix. During the manufacturing of such a pultruded strip the carbon fibers are pulled through a supply of liquid resin, which resin is then heated and cured finally forming the respective pultruded strip. These pultruded carbon fiber strips show excellent mechanical properties in taking the respective loads and distributing them and absorb high bending moments which arise during the blade rotation.

In a known wind turbine blade design as for example disclosed in EP 2 791 500 B1 the blade comprises two first webs, which extend almost entirely over the length of the blades and which are arranged in the central body area, i.e., in the area, where the upper and lower half shell, seen in the drop-like cross section, have a large distance. Also, a second web is provided, which second web is arranged close to the trailing edge of the blade. This second web extends only along a part of the trailing edge, which part often has a specific edge design and is subjected to specific loads, which are taken respectively distributed by this second web.

All webs comprise an elongated web body with the flanges arranged at the ends of the web body. Each web is supported by two reinforcement structures, i.e., spar caps, so that in total six spar caps are arranged in both shells for supporting the three webs. As three webs and six spar caps need to be integrated, the total mass of such a known turbine blade is high, although the mass of the spar caps itself is somehow reduced due to the usage of carbon fiber pultrusion stacks, which on the other hand are expensive.

SUMMARY

An aspect relates to an improved wind turbine blade design allowing a proper load support and having a less complex and heavy design.

For addressing this problem, a wind turbine blade as mentioned above is characterised in that each at least one stack composed of the pultruded composite strips is an integral part of the respective first and second web and builds the respective flange, which is attached to the inner layer of the respective upper and lower shell.

The inventive wind turbine blade is characterised in a specific arrangement regarding the first and second reinforcement structures and has an improved design over known blade designs. The at least one stack forming the respective first and second reinforcement structure is composed of several pultruded composite strips comprising carbon fibers with the strips being fixed in a resin matrix. In this embodiment the respective first and second spar cap are made of carbon fiber pultrusion strips. This respective first and second reinforcement structure is an integral part of the respective first and second web and builds the respective flange, which is attached to the inner layer of the respective shell by the adhesive. The second web according to this embodiment has a H-shape with a central web body and the integral reinforcement flanges attached to the web body. As the web body comprises a resin matrix, this matrix also integrally extends into the respective flanges respectively carbon strip stacks making the respective flange of the H-shaped webs very stiff and a mechanically well adapted piece. The web body may comprise a core for example made of balsa wood, PET or PVC which is arranged in a glass fiber envelope or casing which is resin infused. When producing the web, all respective parts, i.e., the web body parts and the carbon pultrusion strips can easily be arranged in a common web mould by simply inserting the respective core and the fiber layers respective fabrics and the pultruded strips and by finally infusing the total web setup.

A specific advantage of this embodiment is that this H-shaped web can be produced external to the respective shells, already comprising the respective spar cap. This allows a simplified production of the spar caps and especially allows for a proper inspection of the web respectively the connection of the reinforcement structures, i.e., the spar caps to the web body. Furthermore, the adhesive connection of the web flanges, i.e., the spar caps, to the inner layer of the upper and the lower shell needs to take less loads, and the respective reinforcement structures respectively the spar caps are an integral part of the web. As no adhesive joint is given between the web and the carbon strip reinforcement structures as they are an integral part of each web, the overall robustness of the blade can be increased.

The inventive reinforcement structure arrangement can be realised in different blade setups. It is possible that both webs extend over approximately the same length of the blade. Here, both webs are arranged in the hollow blade at positions where the half shells have a rather far distance to each other. In an alternative the second web can be arranged closer to a trailing edge of the blade and extends only along a part of the trailing edge. Here the second web is adjacent to the trailing edge for stiffening this area.

The flange integral first and second reinforcement structures respectively the carbon stacks may furthermore comprise biaxial glass and/or carbon fiber layers between each pair of strips which layers are infused with resin. For bonding the strips to each other fiber layers or fiber fabrics are inserted between the respective strips of the stack. The overall stack therefore has a sandwich setup with a pultruded strip is followed by a fiber layer or fabric which is followed by another strip etc. Inventively the biaxial fiber layers are infused with resin, which resin builds the resin matrix into which the whole stack is embedded. A biaxial fiber layer comprises fibers being arranged at an angle of 0° and other fibers being arranged at an angle of e.g., ±45°. Such a biaxial layer is advantageous, as it allows to take loads of different directions respectively of different types, e.g., loads due to a flapwise or an edgewise bending of the blade.

As the web with the flanges is produced external to the respective half shell, the flange design can be adjusted to the respective needs simply by using a respective web mould designed also for arranging and infusing the pultrusion strip stack together with the biaxial layers. The prefabricated webs are then attached to the separately moulded shells, to which they are attached by an adhesive.

In another embodiment of the invention each of the first and second flange integral reinforcement structures comprises more than one stack arranged in parallel, three stacks which are arranged adjacent to each other. This allows for shaping the overall shape of the respective flange, i.e., the spar caps, along the slightly bended shape of the respective upper and lower inner layer, so that the respective spar caps closely follow the inner layer shape.

As the reinforcement structures, i.e., the spar caps are in integral part of the webs and build their flanges, the design of the respective shell in the area to which the web flanges are attached can be adjusted. In an embodiment, the inner layer is arranged closer to the outer layer in an area where the respective flange of the respective web is attached to the inner layer. The cross section respectively the thickness of the shell in the attachment area is reduced, as no spar cap needs to be integrated in the respective half shell, which have less weight but are still mechanically stiff.

It is possible, that the inner layer is attached directly to the outer layer. Here the inner layer, which is distanced to the outer layer in areas adjacent to the flange attachment areas due to the usual integration of core elements, is guided towards the outer layer and is directly attached to it, so that the thickness in this zone is very small. In an alternative an additional stiffening means is arranged between the inner and the outer layer of the respective half shell, which stiffening element is quite thin so that the overall thickness of this area is still smaller compared to adjacent areas. Such a stiffening means may comprise several glass fiber layers which are embedded in the overall resin matrix of the shell. The fiber fabrics are very thin, so that even when several layers are stacked the overall thickness is not significantly higher. In an alternative a core element embedded in the overall shell resin matrix may be provided. This high-density core element further stiffens or reinforces this area, but it's thickness is small so that again the overall thickness of this area is kept small. Whichever stiffening means is integrated, it provides a better support and load transfer via the first and second web.

For adjusting the mechanical properties of the blade in areas next to the respective flange attachment areas several further core elements may be provided between the outer and the inner layer of the respective upper and lower half shell. These core elements, just like the ones which may be sandwiched in the thinned flange attachment area of the respective shell may be made of a material with a sufficient high density like foam, wood, polymer, or a composite material comprising fiber layer or fabrics being infused with a resin for example, while this enumeration is not final.

The core elements, no matter what material is used, are an integral part of the respective shell and is sandwiched between the outer and inner layer. If a wooden or polymer core element is used, this element is produced as a preform and is then inserted into the respective shell mould, when the respective layers or elements for setting up the respective half shell are inserted into the shell mould. It is fixed to the shell by the resin. In case core elements being made of composite material like glass fiber layers are used, the respective layer stack may be provided directly in the shell mould and may then be co-infused with the resin when the overall shell infusion is performed.

Embodiments of the invention also refer to a wind turbine comprising several wind turbine blades as described, three turbine blades.

BRIEF DESCRIPTION

Some of the embodiments will be described in detail, with reference to the following figures, wherein like designations denote like members, wherein.

DETAILED DESCRIPTION

Figure 1:
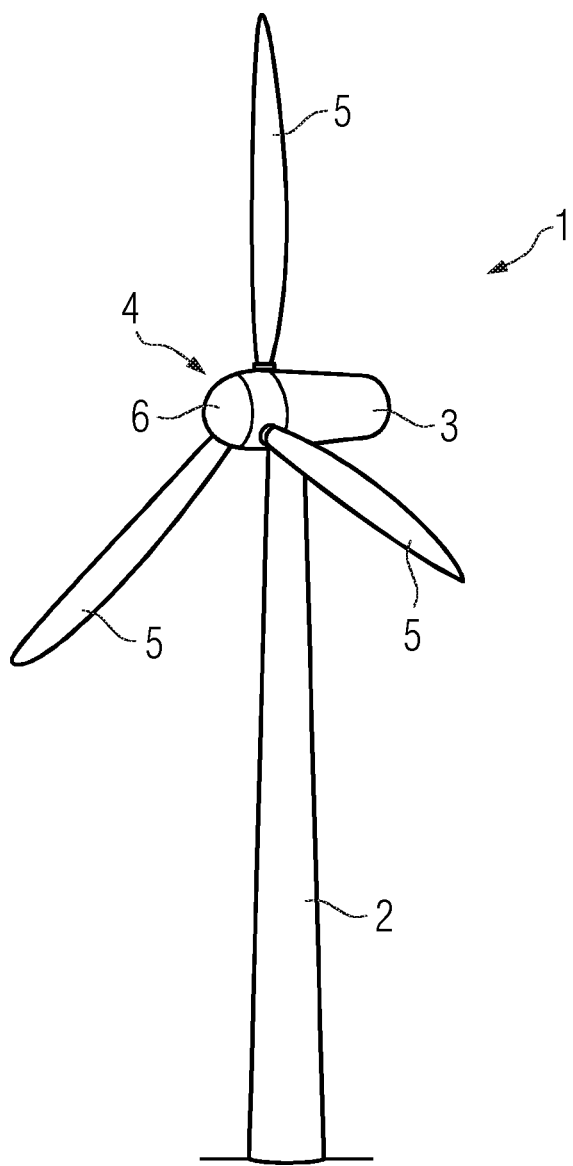
FIG. 1 shows a principal sketch of a wind turbine.

FIG. 1 shows a principal sketch of a wind turbine 1 comprising a tower 2, a nacelle 3 mounted on top of the tower 2 and a rotor 4 comprising three wind turbine blades 5 attached to a hub 6, which is operatively coupled to a generator arranged in the nacelle 3, which generator is driven by the rotational energy of the rotor 4 for producing electric power as commonly known.

Embodiments of the invention relate to the setup of the wind turbine blades 5.

Figure 2:
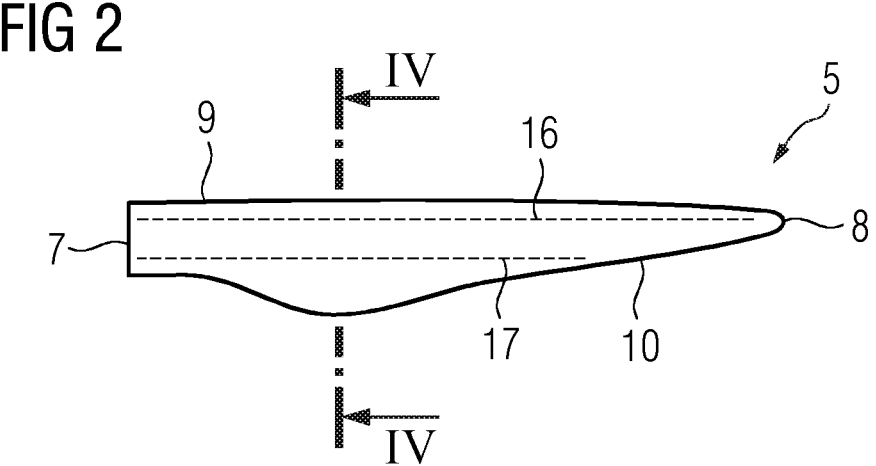
FIG. 2 shows a view of an inventive wind turbine blade of a first embodiment comprising a first web and a second web.

FIG. 2 shows a principle drawing of a turbine blade 5 of a first embodiment with a root 7 for attaching the blade 5 to the hub and with a tip 8 at the other blade end. It furthermore comprises a leading edge 9 and a trailing edge 10.

Figure 3:
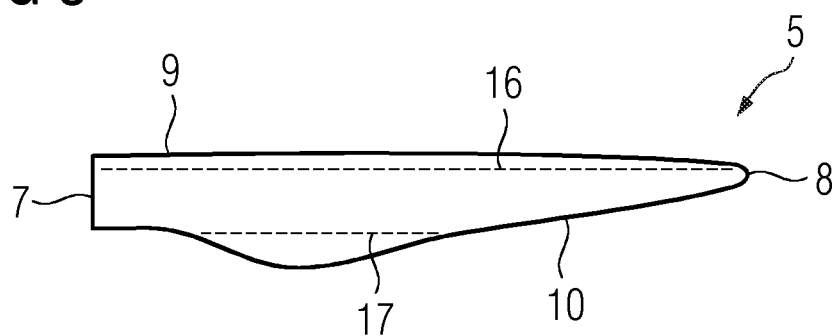
FIG. 3 shows a view of an inventive wind turbine blade of a second embodiment comprising a first web and a second web.

FIG. 3 shows a principle drawing of a turbine blade 5 of a second embodiment with a root 7 for attaching the blade 5 to the hub and with a tip 8 at the other blade end. It furthermore comprises a leading edge 9 and a trailing edge 10.

Figure 4:
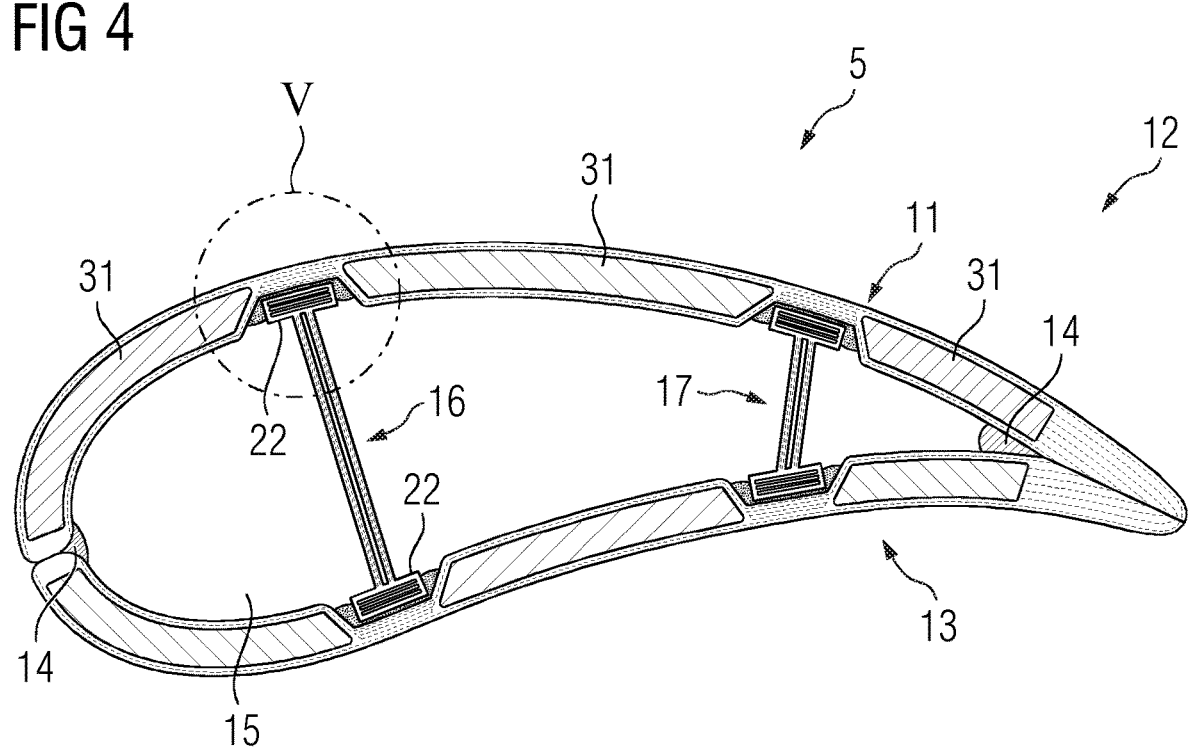
FIG. 4 shows a cross section through the blade of FIG. 2 along the line IV-IV.

The blade 5 comprises, see FIG. 4, a hollow blade body 11, which is made of an upper half shell 12 and a lower half shell 13, which are fixed to each other with an adhesive 14 and which encase a hollow space 15. In this space 15 a first web 16 and a second web 17 are arranged. The first web 16 is arranged at a position where the upper half 12 and the lower half 13 almost have the greatest distance respectively the blade has nearly its maximum profile thickness. As FIG. 2 shows, the web 16 extends almost over the whole length of the blade 5 starting adjacent to the root 7 and ending adjacent to the tip 8.

The second web 17 is arranged closer to the trailing edge 10. It may be arranged in different way. As FIG. 2 shows the second web 17 may, just like the first web 16, extend almost over the whole length of the blade 5 starting adjacent to the root 7 and ending adjacent to the tip 8. Both webs may extend parallel, but this is not compulsory. As FIG. 3 shows, it is also possible that the web 17 extends only over a part of the blade length close to the trailing edge 10.

Both first and second webs 16, 17 are used for supporting the blade shells 12, 13 and for taking and distributing the respective loads resting on the blade and resulting from aerodynamic reasons due to the rotation of the rotor 4 and mechanical reasons due to the weight of the blade 5 itself.

While in the following in reference to FIGS. 5 and 6 the setup of the first web 16 is described in detail, it is to be noted that the same description is valid also for the setup of the second web 17.

Figure 5:
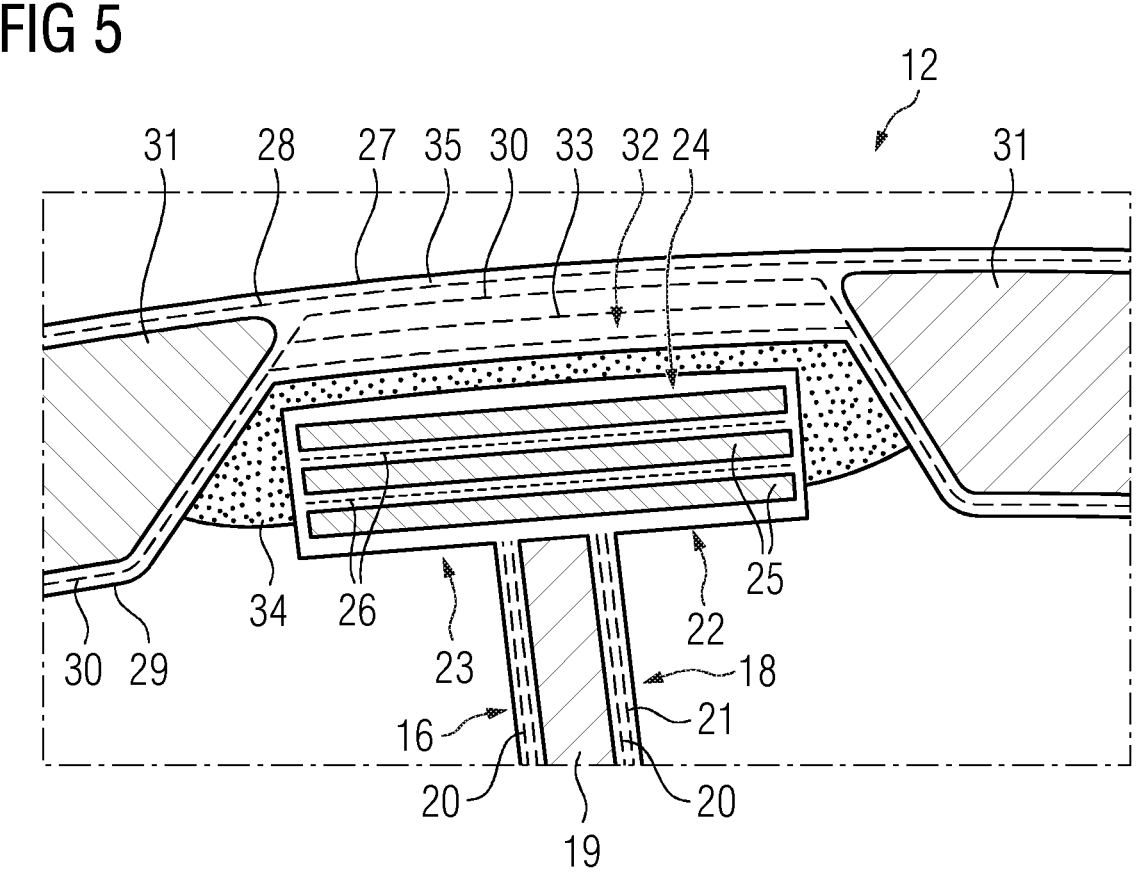
FIG. 5 shows an enlarged view of the section V of FIG. 3 of a first embodiment.

The first web 16 comprises a web body 18 which, see for example FIG. 5 showing the enlarged section V of FIG. 4, comprises a core 19, for example made of balsa wood, a stable foam or a composite material etc. showing the needed mechanical properties for stiffening the whole web 16. The core 19 is encased in one or more glass fiber layers 20 which are resin infused, i.e., embedded in a cured resin 21.

The web 16 further comprises two flanges 22 which are an integral part of the web 16 and which are integrally attached to the ends of the web body 18. FIG. 5 shows only one flange, the setup of the other flange is the same. Each flange 22 also comprises an integrated reinforcement structure 23 comprising a stack 24 made of several pultrusion strips 25 comprising carbon fibers embedded in a resin. Although FIG. 5 shows only three strips 25, only two or more than three strips may be provided. Between each pair of adjacent strips 25 one or more layers 26 of biaxial glass fiber fabric, which are infused with resin for fixing the strips 25, are interposed. A biaxial fiber layer or fabric comprises fibers being arranged in an angle of 0° with other fibers being arranged at an angle of e.g., ±45°. The whole arrangement of the strips 25 and the fiber layers 26 is completely embedded in the overall resin 21 embedding all components of the web 16. Thus, the reinforcement structure 23, i.e., the carbon pultrusion strips 25 with the interleaved fiber layers 26 is an integral part of the web 16, which can therefore be produced as a single complete piece external to the respective half shell 12, 13 itself and can be attached to them when the blade 5 is finally finished.

Due to the separate manufacturing of both webs 16, 17, which, as mentioned, are identical in their setup, the half shells 12, 13 are also manufactured separately in their respective moulds. As the reinforcement structures 23 are an integral parts of the respective webs 16, 17 respectively build the respective flanges of each web 16, 17, no specific reinforcement structures need to be integrated into the respective half shell 12, 13. It is therefore possible, see FIGS. 5 and 6, to have a specific design in the areas of the shells 12, 13, to which the webs 16, 17 are attached by their respective flanges 22.

FIG. 5 shows a first embodiment of such a shell design, while in FIG. 5 only the design of the respective attachment area for the flange 22 of the web 16 of the shell 12 is shown, but the same description is also valid for the design of the respective attachment zone for the flange 22 of the web 17 as well as for the attachment zones of the shell 13.

Each shell 12, 13 comprises an outer layer 27 comprising one or more glass fiber layers 28, and an inner layer 29 also comprising one or more glass fiber layers 30. Between the outer and the inner layers 28, 29 respective core elements 31 are sandwiched. These core elements 31 may be made of balsa wood, high density foam or any other especially light weight stiffening material.

As FIG. 5 clearly shows, in the attachment area, where the web flange is attached, the inner layer 29 is guided closer to the outer layer 27 respectively, see FIG. 5, in direct contact, as shown by the respective glass fiber layers 28, 30. Therefore the shell area is very thin. As shown, it is possible to arrange additional stiffening means 32, here in form of additional glass fiber layers 33 in this area, either adjacent to the glass fiber layer(s) 30 of the inner layer 29, or sandwiched between the glass fiber layers 28 and 30. While in FIG. 5 only one glass fiber layer 28, 30 and 33 is shown, it is possible that more of each of these layers may be provided.

In an embodiment, several glass fiber layers 33 are provided. They may be uniaxial layers or biaxial layers, while also both types may be integrated in a random order, e.g., a uniaxial layer is followed by a biaxial layer which is followed by a uniaxial layer etc, or any other order. A biaxial fiber layer or fabric comprises fibers being arranged in an angle of 0° with other fibers being arranged at an angle of e.g., ±45°. Such a biaxial layer is advantageous, as it allows to take loads of different directions respectively of different types, e.g., loads from a flapwise or an edgewise bending of the blade. A uniaxial layer is adapted to stiffen against a flapwise bending.

The respective attachment area is a way thinner than the blade sections adjacent to the attachment section.

For attaching the respective flange 22 of each web 16, 17 to the half shell 12, 13, an adhesive 34 is used, by which the flange 22 is firmly attached to the respective shell 12, 13.

For manufacturing the inventive blade 5, as already mentioned, both the webs 16, 17 and the shells 12, 13 are manufactured separately in respective moulds. The respective components of the webs 16, 17 and the shells 12, 13 are arranged in the specific mould, whereupon the mould respectively the component setup is infused with resin for firmly embedding all components. The web components are embedded in the resin 21, while the shell components are embedded in the resin 35.

Thereafter both half shells 12, 13 are arranged above each other, with the webs 16, 17 being arranged between them and fixed to the respective shells 12, 13 by the adhesive 34. Also, the adhesive 14 is provided, so that the whole blade 5 is firmly fixed.

Figure 6:
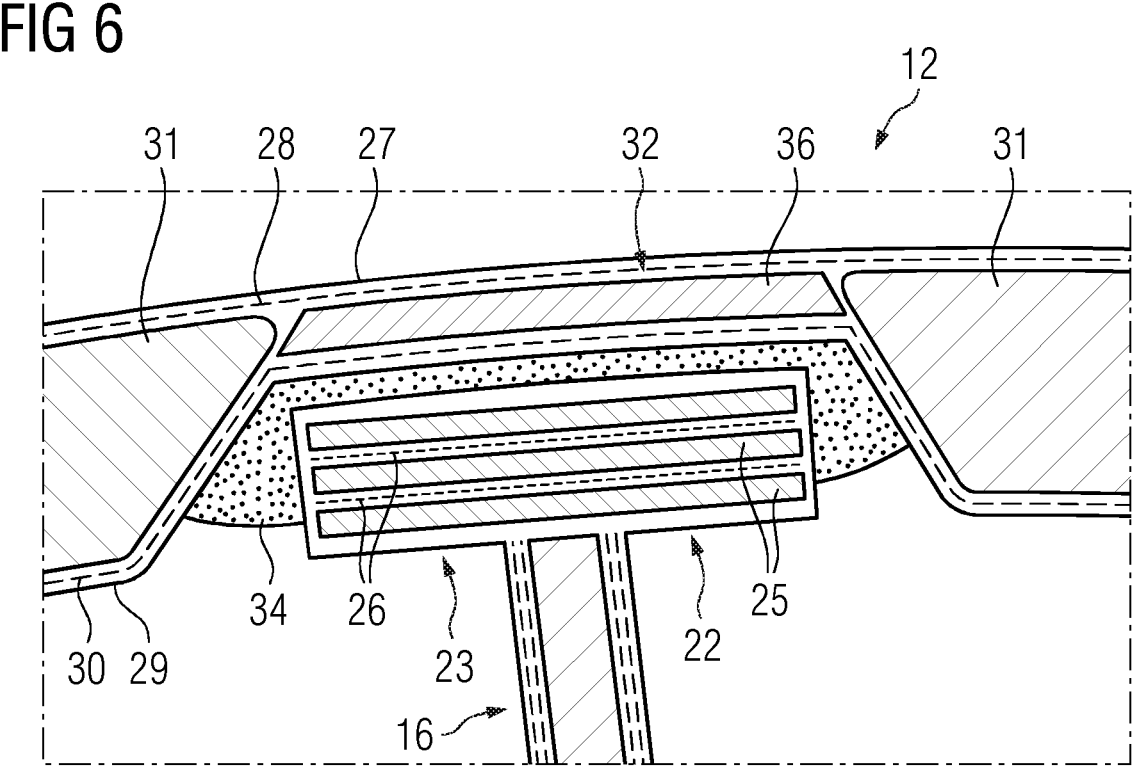
FIG. 6 shows an enlarged view of the section V of FIG. 3 of a second embodiment.

FIG. 6 shows another embodiment of a blade design in the attachment region for the respective web flange 22. Again, the inner layer(s) 29 respectively their glass fiber layers 30 are guided to the outer shell surface closer to the outer layer 27 respectively the outer glass fiber layer(s) 30, but not in direct contact. As shown, at least one core element 36 is sandwiched or interpost between the outer and the inner layer 27, 29 respectively the outer and inner glass fiber layers 28, 30. This core element 36 may also be made of a lightweight stiffening material, which is adapted to act as a stiffening means 32, like balsa wood, high density foam or the like.

Even if such a core element 31 is integrated, again the overall thickness of the shell 12, 13 in this attachment area is clearly smaller than the thickness of the shell 12, 13 in the adjacent parts, in which the core elements 31 are sandwiched. Therefore, it is possible, as shown in FIGS. 5 and 6, to integrate the respective flanges 22 of the web 16 and the flanges of the web 17 into respective recesses provided in the surface of the inner layer 29 of the respective shell 12, 13 by the adhesive 34. This allows to sink the respective flange 22 into the inner layer 29 or surface, it may be almost flush with the surface. A very compact design and setup can be realised, which reduces the overall mass of the blade and with advantage provides only one adhesive joint between the web integral reinforcement structure 23 and the shell 12, 13. As no adhesive joint between the respective reinforcement structure 23, i.e., their respective spar cap comprising the stack 24 of the pultrusion carbon strips 25, and the web body 18 is given, the robustness of the blade design can be increased.

Another advantage is that the joint itself, realised by the adhesive 34, can be repaired, if need be, as it is possible to drill into this joint area from the outside of the blade 5, as only glass fiber layers in a matrix resin 35, may be also a core element 36, are arranged in this area, which can easily be drilled.

Another advantage resulting from the separate manufacturing of the H-shaped webs 16, 17 is that the web quality can be inspected thoroughly, so that a perfect web quality can be secured and, in case of need, any repair may be done directly at the web manufacturing side without affecting the shell mould lead time.

Again, the basic setup of all webs arranged in the blade is the same. Each web comprises a respective web body with a core and resin in view outer glass fiber layer, and an integrated flange comprising an integrated reinforcement structure composed of at least one stack of pultruded strips comprising carbon fibers, no matter if the respective web extends almost over the whole blade length or only over a part of it. Each of these web flange integrated reinforcement structure may also comprise two or more parallel carbon pultrusion stacks allowing to shape the geometry of the respective flange according to the geometry of the attachment area, if necessary. Independent of the final web setup, they all have in common that the respective reinforcement structure respectively the spar cap is completely integrated into the web.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. A wind turbine blade, with a generally hollow blade body comprising:
an upper half shell and a lower half shell, and a first elongated web and a second elongated web each extending in a lengthwise direction of the wind turbine blade and being disposed between and connected to the upper half shell and the lower half shell, the first elongated web and the second elongated web each comprising:
a web body and an upper flange including a first reinforcement structure and a lower flange including a second reinforcement structure integrally attached to ends of the web body, the upper flange and the lower flange connecting the respective elongated web to the respective half shell, and with the first elongated web and the second elongated web being supported by the first reinforcement structure and the second reinforcement structure, respectively, relative to the respective half shell, the first reinforcement structure and the second reinforcement structure extending in the lengthwise direction of the wind turbine blade,
wherein each of the first reinforcement structure and the second reinforcement structure supporting the first elongated web and the elongated second web comprises at least one stack composed of several pultruded composite strips comprising carbon fibers with the several pultruded composite strips being fixed in a resin matrix, each at least one stack of the respective reinforcement structures comprises biaxial glass and/or carbon fiber layers between adjacent strips within the at least one stack which layers are infused with resin, further wherein the resin matrix of each at least one stack composed of the several pultruded composite strips is integral with a resin matrix of the web body of the elongated webs so that the at least one stack is an integral part of the respective first elongated web and the second elongated web and builds the respective flange, which is attached to an inner layer of the respective upper or lower half shell;
wherein the inner layer is arranged closer to an outer layer in an area where the respective flange of the respective web is attached to the inner layer, and a stiffening means entirely disposed in the area and between the outer layer and the inner layer.

2. The wind turbine blade according to claim 1, wherein both webs extend over a same length of the wind turbine blade, or the second web is arranged closer to a trailing edge of the wind turbine blade and extends only along a part of the trailing edge.

3. The wind turbine blade according to claim 1, wherein each reinforcement structure comprises more than one stack arranged in parallel.

4. The wind turbine blade according to claim 1, wherein the stiffening means comprises several glass fiber layers or a core element embedded in resin.

5. The wind turbine blade according to claim 4, wherein several further core elements are provided between the outer layer and the inner layer of the respective upper half shell and lower half shell.

6. The wind turbine blade according to claim 5, wherein the core element or the several further core elements are made of foam, wood, polymer or a composite material.

7. A wind turbine comprising several wind turbine blades according to claim 1.

\* \* \* \* \*